United States Patent [19]
Hiestand

[11] Patent Number: 4,521,028
[45] Date of Patent: Jun. 4, 1985

[54] POWER OPERATED CHUCK HAVING CENTRIFUGAL FORCE COMPENSATION

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 448,238

[22] Filed: Dec. 9, 1982

[30] Foreign Application Priority Data

Dec. 9, 1981 [DE] Fed. Rep. of Germany ....... 3148661
Feb. 10, 1982 [EP] European Pat. Off. ......... 82109110.5

[51] Int. Cl.³ .............................................. B23B 31/14
[52] U.S. Cl. .................................... 279/1 C; 279/121
[58] Field of Search ............... 409/232, 234; 279/1 C, 279/121, 110

[56] References Cited

U.S. PATENT DOCUMENTS

| 2,982,558 | 5/1961 | Multer | 279/1 C |
| 3,656,773 | 4/1972 | Blatiry et al. | 279/121 |
| 3,704,022 | 11/1972 | Blatiry et al. | 279/121 |
| 4,094,522 | 6/1978 | Hiestand | 279/121 X |
| 4,130,290 | 12/1978 | Röam | 279/121 |

FOREIGN PATENT DOCUMENTS

| 2236651 | 7/1972 | Fed. Rep. of Germany | 279/1 C |
| 2132130 | 11/1973 | Fed. Rep. of Germany | 409/234 |
| 2556227 | 6/1977 | Fed. Rep. of Germany | 409/234 |
| 1541011 | 2/1979 | United Kingdom | 409/234 |

Primary Examiner—William R. Briggs
Attorney, Agent, or Firm—McGlew and Tuttle

[57] ABSTRACT

A power operated chuck for lathes comprises a chuck body which has a central bore with at least one groove radially extending from the bore in which a jaw is moved toward and away from the bore for clamping a workpiece in the vicinity of the bore. A receiving pocket is defined in the chuck body adjacent the groove and a key bar is movable in the pocket and has a serrated edge engaged with a serrated edge of the jaw along an engagement line which will effect shifting of the jaw and its associated groove during displacement of the key bar. The shifting element has a portion which engages the key bar for causing the displacement thereof in a controlled amount. The construction includes a free space defined in the chuck body adjacent the receiving pocket with a centrifugal weight therein which is associated with the key and is subject to the action of centrifugal force during rotation of the chuck and it is sized and located to direct a radial force against the jaw at the mating engagement surfaces with the associated key in an amount to compensate for centrifugal forces produced by the rotation of the chuck.

25 Claims, 6 Drawing Figures

POWER OPERATED CHUCK HAVING CENTRIFUGAL FORCE COMPENSATION

FIELD AND BACKGROUND OF THE INVENTION

This invention relates in general to chucks for holding articles for machining and in particular to a new and useful power driven chuck having centrifugal force compensating arrangement.

The invention concerns a power operated chuck for lathes with radially shiftable base or clamping jaws which can be driven by means of key bars guided in the clamping body tangentially to its axis of rotation in receiving pockets, where the key bars can be actuated jointly by an axially displaceable shifting member cooperating with wedge-shaped surfaces or the like, and engage a toothing of the jaws with serrated borders.

A chuck of this type, which works extremely well in practice, is known from German AS 25 56 227. Though this chuck comprises only a few parts, and is thus trouble free and economical to manufacture, it was found that particularly in the application to numerically controlled machine tools, the inwardly directed tension is reduced at high speeds. This is because the outwardly directed centrifugal forces generated by the jaws act against the jaws, and the forces add up in an internal stress and thus with outwardly directed tension, since there is no compensation of the centrifugal force.

Furthermore, hydraulically operated wedge hook chucks are known where the centrifugal force is compensated. To this end are provided compensating elements guided in the clamping body as counterweights, which are operatively connected with the jaws over toggle joints, likewise supported in the clamping body. Apart from the fact that such chucks are large in axial directions, a great disadvantage is that the static stresses acting on a clamped workpiece are sometimes quite different before and after a machining operation. During a revolution of the chuck, the tension transmitted by the shifting member to the jaws is practically completely compensated by the centrifugal force generated by the jaws. In this operating state, the tension is therefore produced by the compensating elements which are connected with the jaws by the guide levers. The shifting element connected over wedge-shaped surfaces with the jaws is thus relived, so that the jaws are shifted, though slightly, by the force still acting on them. When the chuck is stopped, its jaws are retained in this position, since the pressure medium acting on the shifting element is incompressible, so that a higher tension now acts on the workpiece, compared to the first clamping. Since the increase in tension can be quite considerable, this leads frequently to deformation of the clamped workpiece and also of the clamping body.

SUMMARY OF THE INVENTION

The invention provides a power operated chuck for lathes whose jaws can be actuated by means of an axially displaceable shifting element and which, and with which a small axial overall length and great safety, is not only suitable for high tensional forces, but also where centrifugal forces generated by the jaws can be completely compensated with simple means, and without the shifting element being relieved. In particular, the inventive device will prevent an increase in the static stress after machining. Furthermore, the manufacturing costs are low.

According to the invention a power operated chuck has a free space provided in the clamping body or the cover plate connected with the chuck and it is associated with the receiving pockets of key bars. The key bars are provided with a centrifugal weight exposed in radial direction, which protrudes into the free space and the clamping body and/or the key bars have each a pivot bearing on which the key bars or the centrifugal weights bear. By this means the centrifugal force of a centrifugal weight appearing in the rotation of the clamping body can be deflected to a force directed radially inwardly toward the associated key bar in the range of the serrated borders.

In order to be able to accommodate large centrifugal weights, the free spaces should extend over about half the axial length of the receiving pockets, and their outer contour should be adapted to the outer surface of the clamping body, preferably extending parallel to the clamping body.

The centrifugal weight can be formed directly on a key bar as a projection directed radially to the outside, but it can also be connected with the key bar. The weight is shiftable in the axial direction of the bar, so that adaptations to different jaw sizes or other operating conditions are readily possible in a simple manner, if necessary.

For the adjustable holding of the centrifugal weight, the weight is preferably guided by means of a molded-on web in a longitudinal, e.g. T-shaped groove, provided in the key bar, and for the adjustment can be provided a rotatably mounted bolt in the clamping body which extends parallel to its axis of rotation, and which has at its end facing the free space an eccentric journal protruding into the space. The journal engages an outwardly directed pulling groove provided in the centrifugal groove. In addition, in order to receive a possibly large centrifugal weight, the key bar should be stepped in this in this embodiment in the range of the longitudinal groove receiving the key bar.

The pivot bearing associated with the key bars can be formed in a simple embodiment by the preferably rounded transition of the free space into the receiving pockets, or by a recess provided in the key bars, which is open toward the free space receiving the centrifugal weight and which protrudes into the receiving pocket. It is advisable to arrange the pivot bearing of a key bar in a range determined by the width of the associated nose of the shifting element, preferably centrally to the latter.

According to another embodiment it is also possible to provide the centrifugal weight with a preferably offset extension extending in the direction of the key bar, by means of which the latter is pivotally mounted on one side on a bolt held in the clamping body parallel to its axis of rotation, and which bears on the key bar in the range of the serrated borders, preferably over a nose. Here too, the bolt should be inserted into the clamping body in a range determined by the width of the associated nose of the shifting element, preferably centrally to the latter, and the key bar should be stepped at the end facing the centrifugal weight.

In order to reduce the force acting in an opposite direction to the centrifugal weight, it is advisable to provide one or more free spaces in the key bars in the range opposite the associated centrigual weight.

Furthermore, in order to prevent locking of the jaw toothings in the serrated borders, the toothing can be relieved in the range remote of the pivot bearings, preferably up to the center of the jaw. This also has a favorable effect on the lever conditions of the force acting on a key bar.

According to another embodiment, the free spaces receiving the centrifugal weights can also be provided on the side opposite the serrated borders of the key bars in the clamping body and/or in the cover plate.

In this embodiment it is advisable to form the pivot bearings by a preferably wedge shaped recess provided on the outwardly directed face of a key bar and/or on the inwardly directed face of a receiving pocket, which extends in the axial direction of the clamping body, so that the centrifugal weights are arranged axially directly behind the key bars.

It is also of advantage to design the centrifugal weights as ring segments which are inserted with radial play into the free space and which are connected with the key bars over an extension, e.g. in the form of a bolt, engaging a groove, on the side opposite the serrated borders, whereby the centrifugal weights are held resiliently in radial directions, e.g. by compression springs inserted into the weights and bearing on the cover plate. In addition, the centrifugal weights should be held non-rotatably by means of one or more guide bolts arranged axis-parallel and inserted into the bolts or the clamping body or the cover plate, which engage with their free end radially directed grooves.

For manufacturing reasons it is furthermore of advantage to design the free space receiving the centrifugal weights as a circumferential groove provided in the cover plate, and to arranged ring segment type distance pieces in circumferential directions between the individual centrifugal weights.

In order to increase the centrifugal force of the centrifugal weight, the weight can be provided with an insert or be made of a heavy metal.

It is also of advantage to dimension the centrifugal weight in its mass and the distance of the resulting forces from the pivot bearing in such a way that the centrifugal force generated by a jaw in a certain speed range of the chuck corresponds to the force exerted by the centrifugal force of the centrifugal weight on the key bar in the range of the serrated borders.

In a power operated chuck with a clamping body on the back that can be closed by a cover, it is furthermore advisable in order to prevent deformation of the clamping body, to support the body in radial directions in the range of the pivot bearings by a collar formed on the cover, by means such as bolts inserted into the cover, by screws etc.

The power operated chuck according to the invention is characterized not only by low manufacturing costs, great reliability and inherent stability, but particularly in that the centrifugal force generated by the jaws is automatically compensated, without the stuffing element being relieved and without increasing the static stress after machining, because if centrifugal weights protruding into free spaces of the clamping body are assigned to the key bars, and/or if pivot bearings are provided on the key bars, on which the key bars or the centrifugal weights bear, the centrifugal forces produced by the centrifugal weights are transmitted in a simple manner to the key bars, namely to the parts provided with the serrated borders. There is no relief of the shifting element, so that it maintains its position and the static stress is not increased.

Due to the design according to the invention, the centrifugal forces generated by the jaws are compensated without the key bars performing an axial movement. These are rather turned slightly in radial directions about a pivot bearing. This swivel movement is possible because the key bars are guided or relieved with some play in the receiving pockets of the clamping body, and bear on the outer guide faces of the receiving pockets in an outside stress on the workpiece. Besides, the key bar adapts itself to the elasticity of the clamping body, so that deformations both of the clamped workpiece and of the clamping body are positively prevented. The tensional force rather remains always constant at changing speeds, as well as in a stoppage of the chuck.

Accordingly it is an object of the invention to provide an improved power operated chuck which includes a key bar having an engagement surface engaged with the jaws moving them and which has a weight associated therewith which acts on the bar so as to compensate for centrifugal forces which are produced by rotation of the chuck.

A further object of the invention is to provide a power operated chuck for lathes which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular the invention embodied therein comprises a power operated chuck generally designated 1 which is principally for lathes and comprises a chuck body 2 which has a central bore 2a and which is rotatable about an axis of rotation generally designated A. At least one groove 3 extends radially from the bore and jaw 4 is movable in the groove and has a rear face 5 with a toothing or serrations engaged with a serrated edge 8 of a key bar 7. A shifting element 11 has a nose portion 12 with a surface 13 which is advantageously wedge shaped and engages a similar surface of the key 7 and it is displaceable so as to the shift the key 7 and displace the jaws in a selected manner.

In accordance with the invention a centrifugal weight 31 is associated with and is movable with the key bar 7 and subject to the actions of centrifugal forces during the rotation of the chuck body 2. The weight acts on the key bar 7 which in turn acts through its mating serrated edges 8 and 5 with the jaws 4 so as to direct a radial force against the jaws in an amount to compensate for the centrifugal forces produced by the rotation of the chuck.

Figure 1:
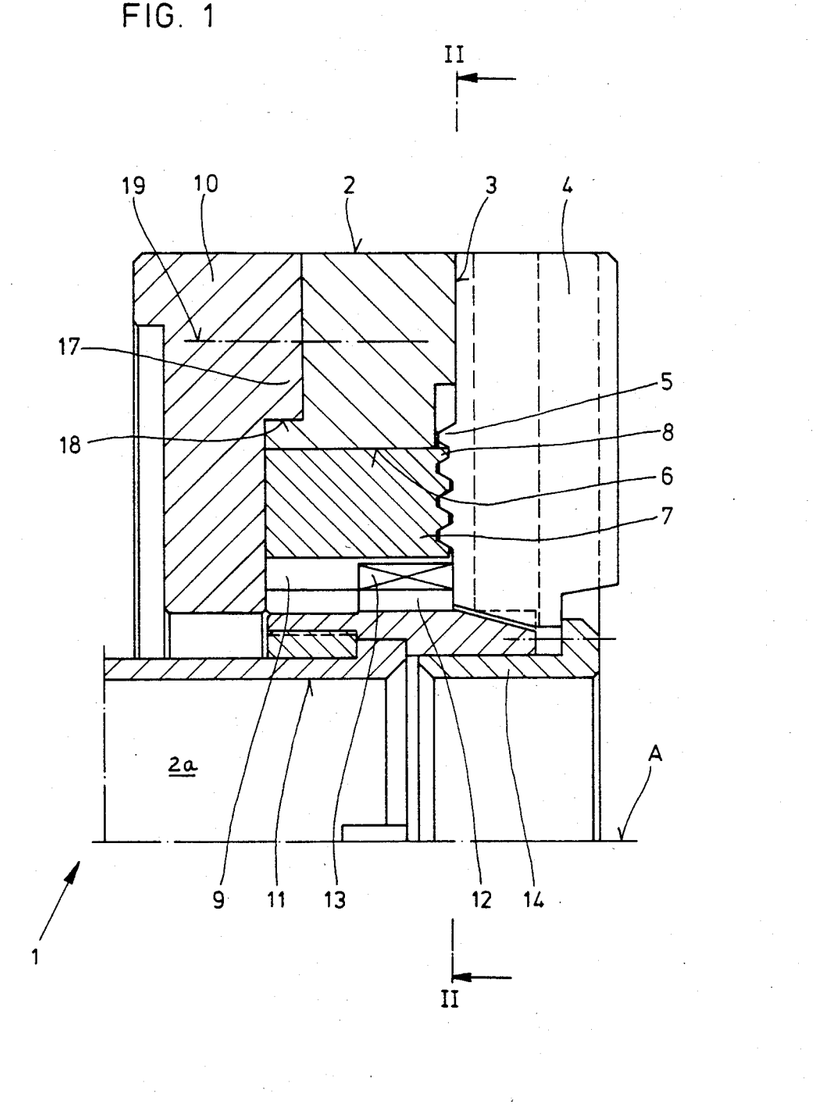
FIG. 1 shows in a longitudinal sectional view of a power operated chuck actuated by means of a shifting element constructed in accordance with the invention.
Figure 2:
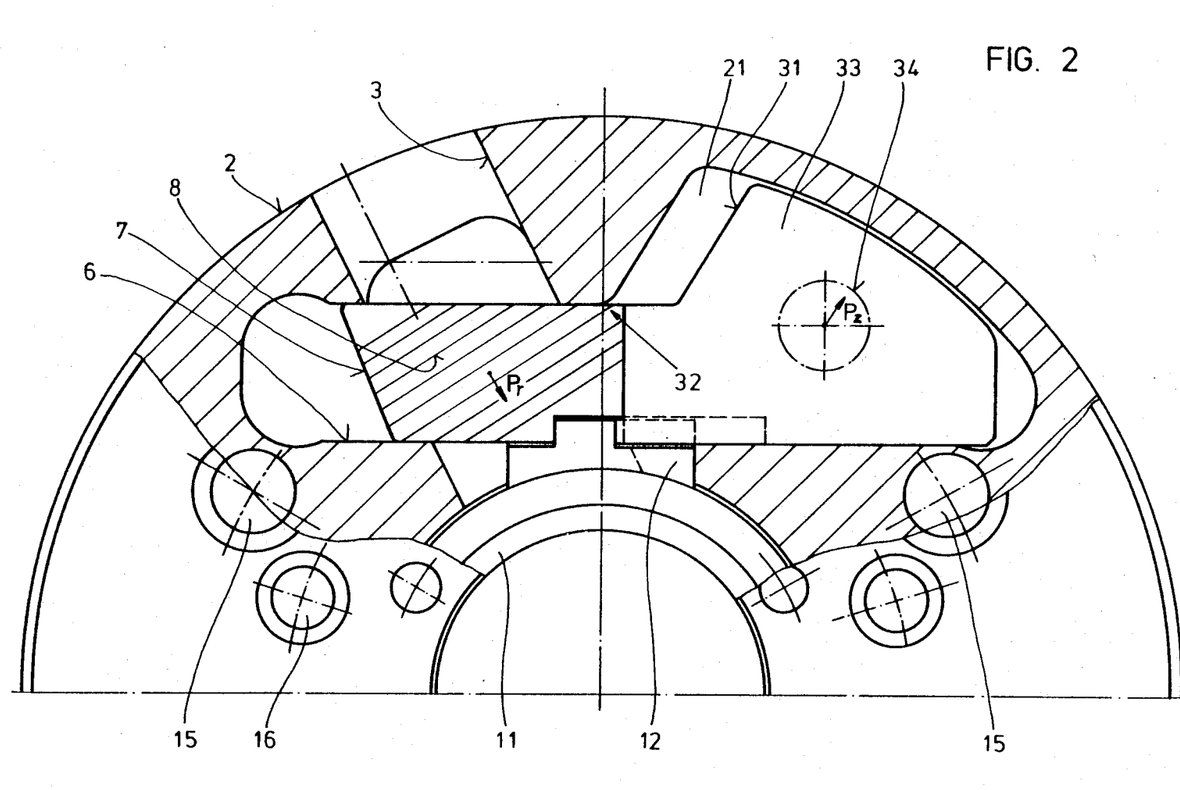
FIG. 2 is a section taken along line II—II of FIG. 1 and with a centrifugal weight formed on the key bar.

The power operated chuck 1 shown in FIG. 1 has, in clamping body 2, base or clamping jaws 4 guided displaceably in radially directed grooves 3, which can be actuated by means of key bars 7 which can be shifted tangentially to the axis of rotation A of chuck 1. To this end key bars 7 are arranged in receiving pockets 6 of the clamping body 2 which are equipped at the front with serrated borders 8 which engage a toothing 5 provided on jaws 4 on their back or rear faces in the inwardly directed sides of key bars 7 have an inclined surface 9 which cooperates with wedge shaped surface 13 formed on nose 12 of shifting element 11 protruding into clamping body 2. The clamping body 2 is closed at the back by a cover 10 which is secured on clamping body 2 by means of screws 16 (FIG. 2). A bushing 14 is threadably engaged in the clamping body 2.

In order to be able to shift jaws 4 of the chuck 1, which is secured by screws 15 on a lathe in radial direction, shifting element 11 must be removed axially, e.g. by means of a clamping cylinder or a tension rod (not shown). Due to the wedge surfaces 13 formed on its nose 12, which cooperate with the opposite faces 9 arranged on key bars 7, the key bars 7 are shifted tangentially to the axis of rotation A of the chuck 1, and since serrated borders 8 are arranged inclined toward their shifting direction, jaws 4 engaging the latter with a toothing 5 are taken along.

In order to compensate the centrifugal force generated by jaws 4 in a rotation of the power operated chuck 1, by which the tension started by shifting element 11 and acting on the clamped workpiece is impaired, key bars 7 are equipped in the range opposite serrated borders 8 with a centrifugal weight 31 which protrudes into a free space 21 provided in clamping body 2 and adjoining receiving pockets 6; and the clamping body 2 is furthermore provided with a pivot bearing 32. The pivot bearing 32 is formed in the embodiment of FIG. 2, by the rounded transition of free space 21 into receiving pockets 6.

Key bar 7 bears thus pivotally on clamping body 2, so that the centrifugal force Pz generated by the centrifugal weight 31 rigidly connected with the bar and which comprises a projection 33 directly on the key bar 7, is deflected by pivot bearing 32 into an inwardly directed force Pr acting in the range of serrated borders 8, and since jaws 4 engage serrated borders 8 with their toothing 5, the centrifugal force generated by them is counteracted, and are automatically compensated with corresponding dimensioning of centrifugal weight 31 and the location of action of the resulting forces. In order to increase the mass of centrifugal weight 31, the latter can be provided, as indicated in FIG. 2 by dot-dashed lines, with an insert 34 of a heavy metal, e.g. lead.

The centrifugal force is thus compensated, without key bars 7 being moved in axial direction and thus relative to shifting element 11. Key bars 7 are rather only turned about pivot bearing 32 corresponding to the play necessarily existing in its guide, there is no increase in the static stress, since shifting element 11 maintains its position even in a rotation of clamping body 2; rather the clamping force exerted at the start of a clamping operation by jaws 4 on a clamped workpiece remains constant during the entire clamping period.

Figure 3:
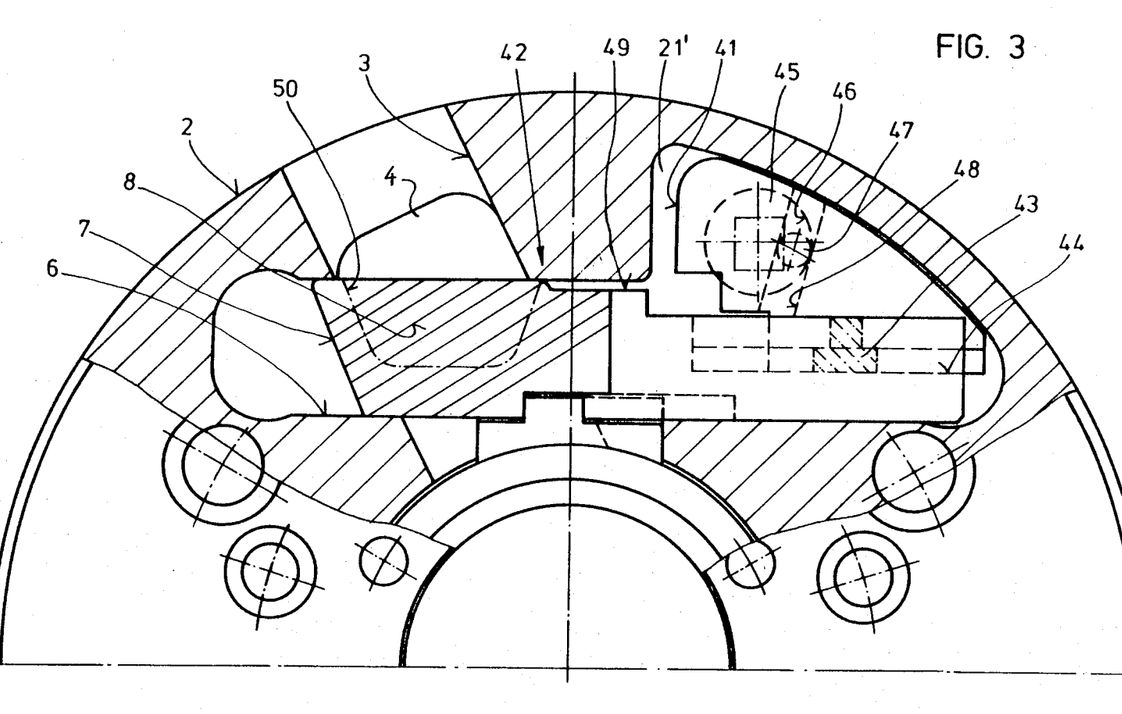
FIG. 3 shows the power operated chuck according to FIG. 2 with a centrifugal weight arranged adjustably on the key bar.

In the embodiment according to FIG. 3, centrifugal weight 41 protruding into free space 21' of the clamping body 2 is adjustable on the key bar 7 in the longitudinal direction of the latter. To this end a T-shaped longitudinal groove 44 is provided in the part of key bar 7 associated with a free space 21' and of the chuck body 2 and centrifugal weight 41 is equipped with an extension 43, which can be moved in longitudinal groove 44. For shifting and locking centrifugal weight 41 is provided a bolt 45, rotatably mounted in a core 46 of clamping body 2, which has an eccentrically arranged journal 47 at its front end facing free space 21', and centrifugal weight 41 is provided with an outwardly directed pulling groove 48, which is engaged by journal 47. When bolt 45 is turned by a tool inserted into its recess (shown in dot-dashed lines), centrifugal weight 41 is moved over journal 47 in a selected longitudinal direction of the key bar 7.

This way the distance of the centrifugal weight 41 from a pivot bearing 42, which is formed by a recess 49 in the key bar 7 can be changed and thus change the moment generated by its centrifugal force. In addition, a free space 50 can be provided in key bar 7 in the range of serrated borders 8 into the latter as indicated by the dot dashed line, in order to reduce its mass and thus the centrifugal force produced by this part of key bar 7.

Figure 4:
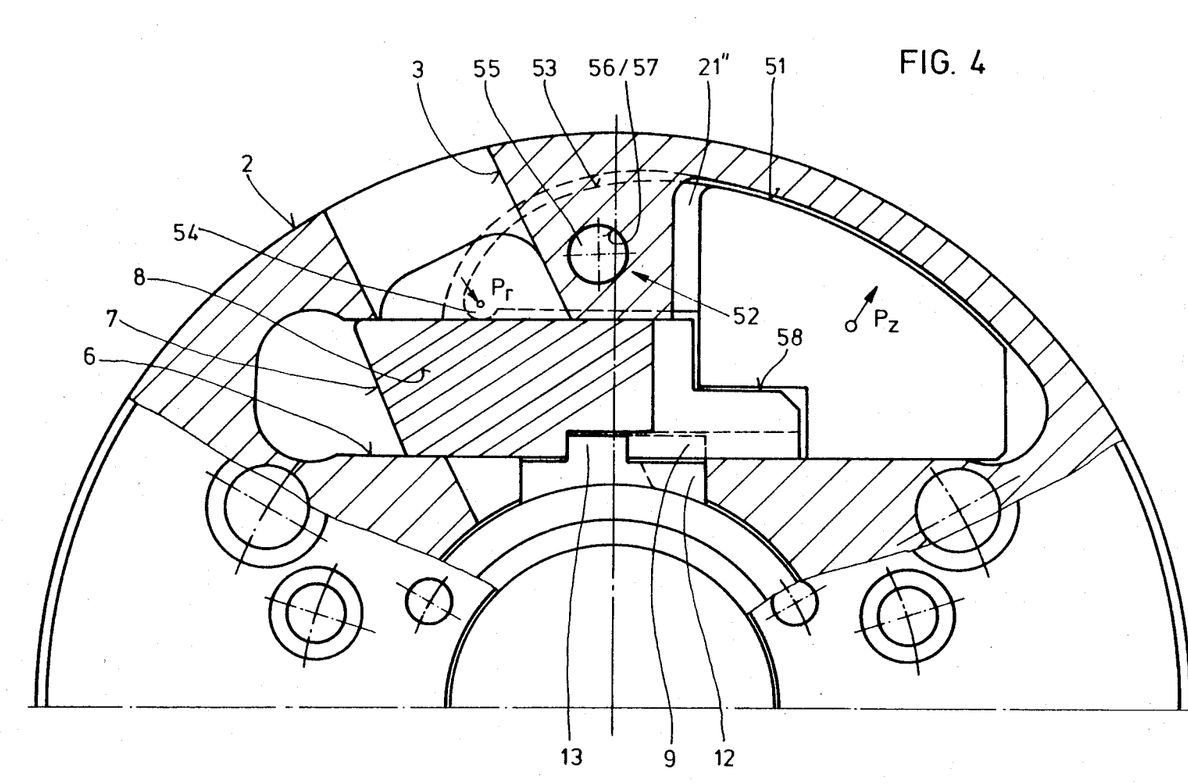
FIG. 4 shows the power operated chuck according to FIG. 2 with a different support of the centrifugal weight associated with the key bar.

According to FIG. 4, centrifugal weight 51 in free space 21" is pivotally mounted and bears on key bar 7 in the range of serrated borders 8 of the latter. To this end an offset extension 53 is formed on centrifugal weight 51, and in clamping body 2 is mounted in a bore 56 as a pivot bearing 52 a bolt 55 which engages a bore 57 of extension 53. Extension 53 bears with a nose 54 on key bar 7. Centrifugal weight 51 is thus pivotally mounted on one side, and since key bar 7 is provided with a heel 58 at the end protruding into free space 21", centrifugal weight 51 can be selected large in its size.

Centrifugal force Pz, generated by centrifugal weight 51, which like centrifugal weight 31 and 41 according to FIG. 2 and 3, are not guided radially in free spaces 21' and 21", but can move slightly to the outside in a rotation of clamping body 2 corresponding to the tolerances in receiving pockets 6, is thus transmitted over pivot bearing 52 to key bar 7 in the range of serrated borders 8. The centrifugal force generated by jaws 4 is effectively counteracted so that this force is compensated and the tension introduced by shifting element 11 always acts on the workpiece.

In order to prevent deformation of the clamping body 2, cover 10 is provided with a collar 17 on the cylindrical face 18 of which clamping body 2 bears all around and thus also in the range of pivot bearings 32, 42, 52. Instead of collar 17, can also be inserted, as shown by the dot-dashed center line, in cover 10 in the range of pivot bearing, the bolt 55 on which clamping body 2 can bear.

Figure 5:
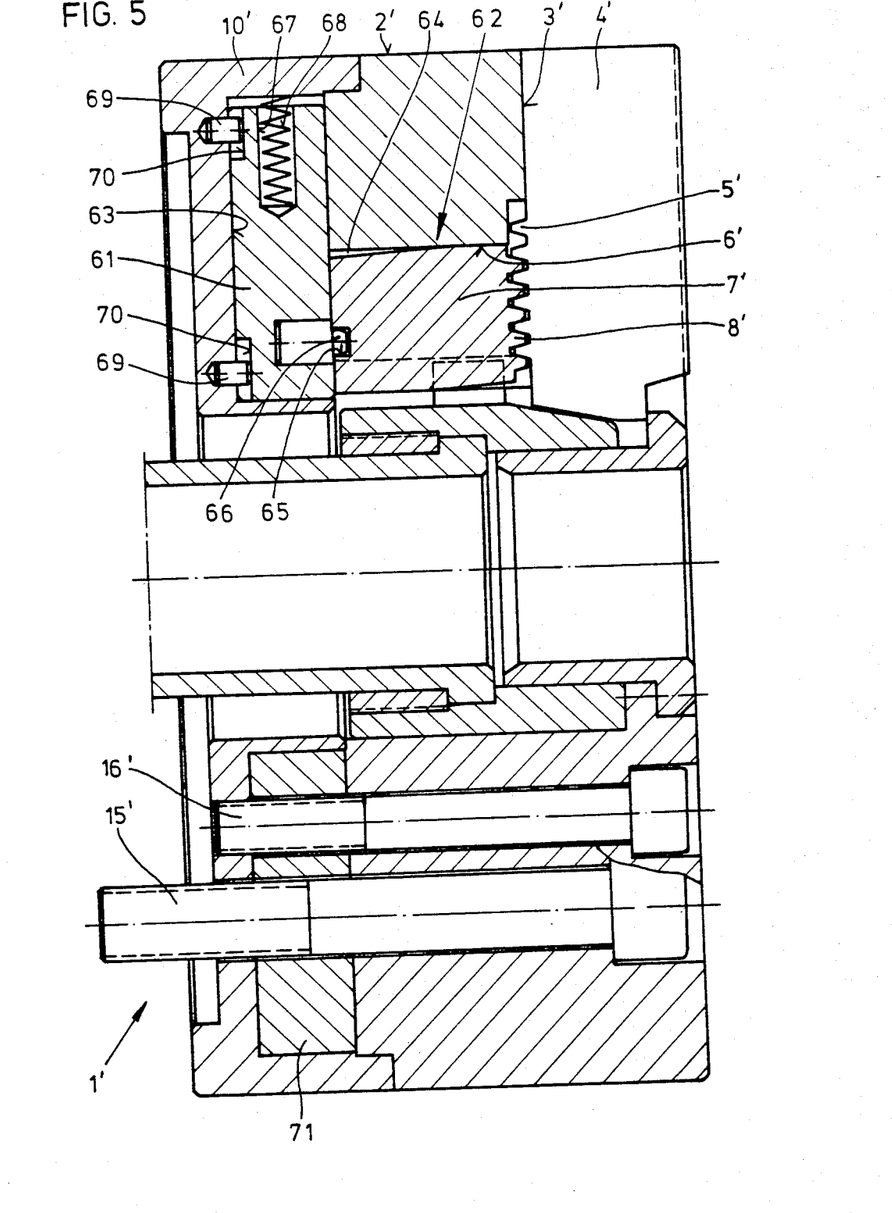
FIG. 5 is a view similar to FIG. 1 of a different embodiment of power operated chuck.
Figure 6:
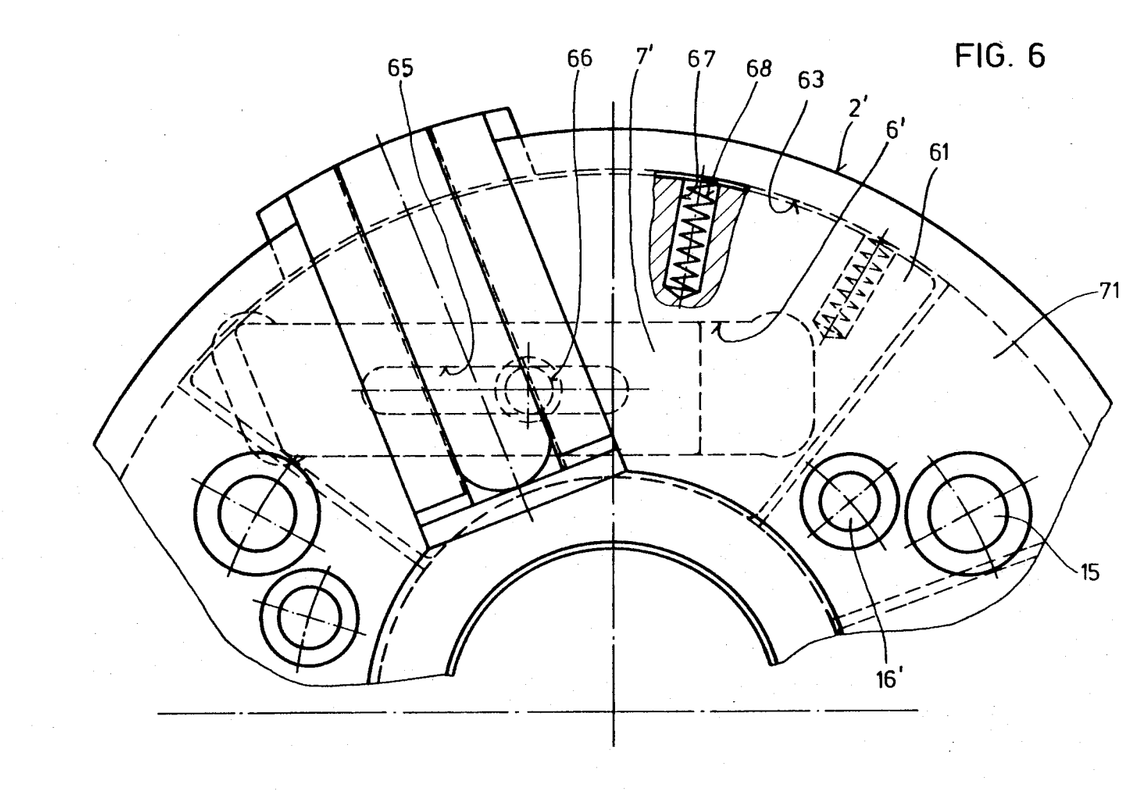
FIG. 6 is a front elevational view of the power operated chuck according to FIG. 5 in a front view.

The power operated chuck 1' shown in FIG. 5 and 6 has likewise in a clamping body 2' clamping or base jaws 4' guided in radially directed grooves 3' which can be operated by means of key bars 7' arranged in receiving pockets 6' and shiftable tangentially to the axis of rotation, which engage with serrated borders 8' the toothing 5' provided in jaws 4'.

For compensating the centrifugal force generated by jaws 4' are provided again centrifugal weights 61, which are arranged in free spaces 63 provided in a cover plate 10' rigidly connected with clamping body 2' by means of screws 16'. In addition, a pivot bearing 62 is provided by means of which the outwardly directed centrifugal forces of centrifugal weights 61 generated during the rotation of power operated chuck 1' are deflected by an inwardly directed component in the range of jaws 4'. Pivot bearings 62 are formed here by a wedge shaped recess 64 incorporated in an outwardly directed face of key bars 7' and extending in axial direction.

But it is also possible to arrange in the same manner a pivot bearing in the inwardly directed face of receiving pockets 6'.

Centrifugal weights 61 associated with key base 7' are designed as ring segments and inserted with a radial slight clearance into free space 63 provided in cover plate 10' and designed as a circumferential groove; they are thus easy to manufacture. In circumferential direction are arranged between centrifugal weights 61 ring segment type distance pieces or spacers 71, which are clamped by screws 16' between clamping body 2' and cover plate 10'. These parts are positively connected with each other over bolts 66, projecting in axial direction from centrifugal weights 61, which engage grooves 65 of key bars 7'. Besides, centrifugal weights 61 are secured against rotation by means of bolts 69 guided in radially directed grooves 70, additional and centrifugal weights 61 are pushed back into their starting position by compression springs 68 on cover plate 10' and inserted in radial bores 67.

While specific embodiments of the invention have been shown and described in detail to illustrate the application of the principles of the invention, it will be understood that the invention may be embodied otherwise without departing from such principles.

What is claimed is:

1. A power operated chuck for lathes, comprising a chuck body having a central bore with at least one groove extending radially of the bore, a jaw movable in the groove having a rear face with serrations, a receiving pocket defined in said body adjacent to the groove, a key bar movable in said pocket having a serrated edge engaged with the serrated edge of said jaw to shift said jaw inwardly and outwardly in the associated groove, a shifting element having a surface engageable with said key bar shifting said bar, said chuck having a free space alongside said receiving pocket and a centrifugal weight associated with and movable with said key bar and subject to centrifugal force during rotation of said chuck to act on said bar and said jaw to direct the radial force against said jaw in an amount to compensate for centrifugal force produced by the rotation of the chuck.

2. A power operated chuck according to claim 1, wherein said chuck body has a wall portion between said free space and said receiving pocket defining a pivot bearing for said key bar, wherein the outer contour of the wall portion of said chuck defining said free space conforms to the outer surface of said chuck body substantially parallel thereto.

3. A power operated chuck according to claim 1, wherein said chuck body includes a wall portion forming said free spaces which has a surface which is substantially parallel to the outside surface of said chuck body.

4. A power operated chuck according to claim 1, wherein said centrifugal weight is formed integrally with said key bar.

5. A power operated chuck according to claim 1, wherein said centrifugal weight is movably mounted on said key bar.

6. A power operated chuck according to claim 5, including means adjustably holding said weight on said key bar, said key bar being movable along the length of said key bar.

7. A power operated chuck according to claim 5, including a bolt rotatably mounted on said chuck body, said centrifugal weight being mounted for pivotal movement with said chuck parallel to the axis of rotation of said chuck, the wall between said free space and said pocket defining a journal having a pulling groove formed in said centrifugal weight and directed radially to the exterior of said chuck body.

8. A power operated chuck according to claim 1, wherein said key bars are provided with a stepped edge and have a longitudinal groove defined along a portion of the length thereof receiving said centrifugal weight.

9. A power operated chuck according to claim 1, wherein the chuck has wall between free space and said pocket defining a pivot bearing, said key bar being pivotal on the pivot bearing.

10. A power operated chuck according to claim 9, wherein said pivot bearing is formed by a recess worked into said key bar which is open towards said free space, said centrifugal weight being located in the free space protruding into said receiving pocket.

11. A power operated chuck according to claim 9, wherein said pivot bearing of said key bar is arranged in a region adjacent said shifting member, said shifting member having a nose directly adjacent said pivot bearing.

12. A power operated chuck according to claim 1, wherein said centrifugal weight has an offset extension extending in the direction of said key bar and means of which it is pivotally mounted on one side as pivot bearing, a bolt extending through said clamping body for expecting pivoting of said pivot bearing with the weight thereon parallel to the axis of rotation of said chuck body.

13. A power operated chuck according to claim 12, wherein including a bolt inserted through said clamping body adjacent said nose.

14. A power operated chuck according to claim 12, wherein said key bar is stepped at the end facing said centrifugal weight.

15. A power operated chuck according to claim 14, wherein said key bars are provided in the range opposite the associated centrifugal weight of at least one free space.

16. A power operated chuck according to claim 1, wherein said serrated edges of said key and said jaws comprise teeth which are interengaged and are relieved in the range remote from said pivot bearing.

17. A power operated chuck according to claim 1, including a back cover closing said clamping body and at least one bolt inserted into said cover to hold it to said body and supporting said body.

18. A power operated chuck according to claim 17, wherein said free space receiving the centrifugal weight are provided on a side of said chuck opposite to said key bars.

19. A power operated chuck according to claim 1, including pivot bearings formed by each of a substantially wedge-shaped recess between said free space and said receiving pocket directed outwardly toward the face of said key bar and extending in an axial direction of said chuck body.

20. A power operated chuck according to claim 1, wherein said centrifugal weights comprise a plurality of ring segments which are inserted with radial play into said free space and including a bolt interconnecting said ring segments on the side opposite said serrated edges of said key bar and said jaws.

21. A power operated chuck according to claim 20, wherein said centrifugal weight comprises a plurality of weights resiliently held in a radial direction and compression springs in said chuck bearing against said weights.

22. A power operated chuck according to claim 20, wherein one of said weights are held non-rotatably and including at least one guide bolt inserted into one of said weights and said clamping body.

23. A power operated chuck according to claim 1, wherein the free space of said chuck body having said centrifugal weight comprises a circumferential groove, said chuck having a cover plate in which said circumferential groove extends, said centrifugal weight comprising ring segment distance pieces arranged in circumferential direction between the individual weights.

24. A power operated chuck according to claim 1, wherein said centrifugal weight includes an insert of a heavy metal.

25. A power operated chuck according to claim 1, wherein said centrifugal weight are dimensioned so that their mass and spacing from the pivot bearing in a certain speed range corresponds to the force exerted by the centrifugal force of said centrifugal weight on the key bar in the range of the serrated borders.

* * * * *